Feb. 2, 1932.　　　C. J. DUMBOLTON　　　1,843,809

HYDRAULIC MINING SHOVEL

Filed June 16, 1930

INVENTOR
Charles J. Dumbolton
BY J. L. Rivess
ATTORNEY

Patented Feb. 2, 1932

1,843,809

UNITED STATES PATENT OFFICE

CHARLES J. DUMBOLTON, OF SEATTLE, WASHINGTON

HYDRAULIC-MINING SHOVEL

Application filed June 16, 1930. Serial No. 461,364.

My invention has reference in particular to a shovel adapted to be utilized in elevating and conveying unworkable material away from the immediate location of an hydraulic mining operation.

In such operations, where an hydraulic monitor is employed in sluicing placer ground, boulders and other unworkable material accumulate by force of gravity at the workings, covering up pay matter and otherwise interfering with the sluicing. It is neither desirable nor practical to force said material to the sluices commonly provided, and in order to eliminate the same the practice generally heretofore has been to segregate the unworkable material by hand labor so as to leave the adjacent workable matter unhampered and freely subject to the sluicing action of the monitor, the said material then being hauled away, or otherwise set aside. The segregation and disposal of the unworkable material is thus effected in a manner which obviously is slow, laborious and expensive.

This invention is designed to do away with the disadvantages incident to a hand-picking of said material, and also to greatly facilitate its removal from the site of the sluicing.

The objects of the invention, generally stated, are, to provide a shovel, operatively connected with a derrick and having its scoop portion constructed mainly of a plurality of spaced tines which act particularly upon said material, leaving the workable matter in a position to be sluiced; to afford in such a shovel pivotal connections which permit it to follow the ground on which it is operating and to dump said material at any desired angle; and, to make available a device of this character which is simple in construction and one that will meet the requirements of rough usage.

Other objects, capabilities and advantages will appear as the description of the invention progresses.

In the accompanying drawings—

Referring more particularly to the drawings, 1 denotes the boom of said derrick, which derrick is designed to be of the portable variety and actuated by any suitable power, and 2 and 3 lines operatively connected with the derrick and utilized in supporting and manipulating the shovel, as will be hereinafter detailed.

Figure 1:
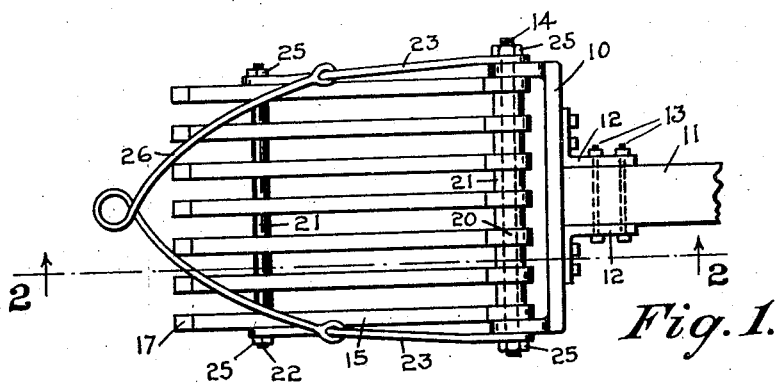
Figure 1 is a top view of the shovel, which shovel includes a handle-like arm for connecting it with said derrick, said arm being now disposed in a horizontal position and broken away.
Figure 2:
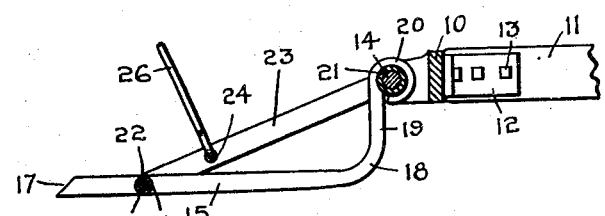
Fig. 2 is a cross section drawn on the line 2—2, of Fig. 1.
Figure 3:
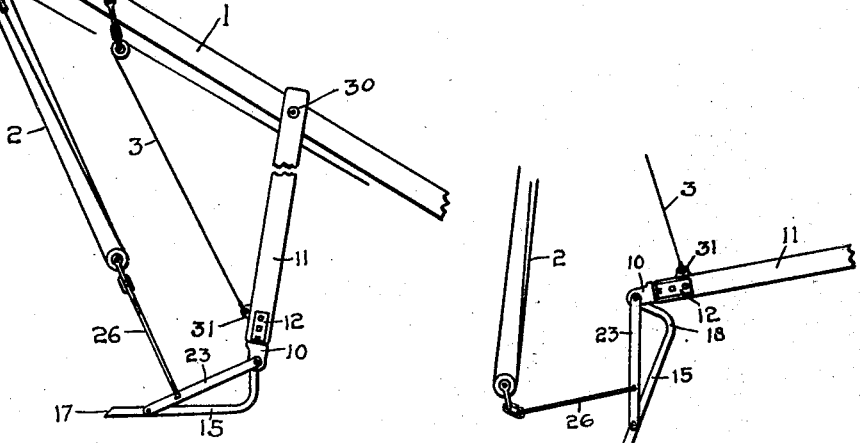
Fig. 3 is a side elevation of the shovel and part of said derrick, including a boom and lines mounted thereon for operating said shovel, the boom and said arm being shown in broken sections and the shovel in a loading position.
Figure 4:
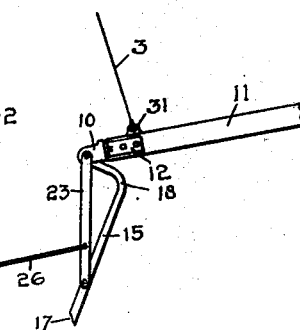
Fig. 4 is also a side elevation of said shovel, including said lines, the lines and arm being broken away, and the shovel illustrated as in a dumping position.

The shovel, chiefly of metallic construction, comprises a yoke 10 carrying the arm heretofore referred to and now designated as 11. Said arm, disposed centrally of the yoke and extending longitudinally of the shovel, is preferably made of wood and is secured at one end to the yoke by an angle iron 12—located on each side of said end— and the bolts 13, as indicated in Fig. 1. 14 denotes a rod threaded at its ends and mounted in the yoke, the rod extending through and projecting beyond each end of said yoke. A plurality of tines are pivotally mounted on said rod and between the ends of the yoke to form the main scoop portion of the shovel. In the present embodiment of the invention each tine is of identical construction, and consists of a bar having an horizontal portion 15, apertured as indicated at 16 and beveled at its free end, as at 17, and its other end formed into a bight 18 from which extends an upstanding portion 19 terminating in an eye 20 adapted to slidably engage the rod 14.

Annular spacers 21, which may consist of sections of piping, are disposed on the rod 14, each being located between adjacent pairs of said tines and serving to afford suitable and equal spacing for the tines. 22 designates a rod having threaded ends, extending through the opening 16 in each tine and projecting beyond each of the outer tines of the assembly, said rod being also provided with like annular spacers 21. The rod 22 and said spacers obviously serve to keep the forward ends of the tines in alignment and properly spaced. A side member 23, apertured as at 24 and adapted to engage the ends of the rods 14 and 22, is disposed at each end of said yoke and pivotally connected with the rod 14, each side member being also mounted on the rod 22, and said members are secured in place by the nuts 25 engageable with the rods. Said side members, in cooperation with the yoke, also serve to hold the tines in place. 26 denotes a bail for the shovel, the same being swingingly mounted in the opening 24 in each of the side members.

The shovel is operatively connected with the derrick by pivoting the arm 11 to the boom 1 of said derrick, as at 30, and by connecting up the line 2 with said bail, and the line 3 with the eye 31 projecting from said arm.

The portable derrick, with which the shovel is designed to be connected, permits it to be brought up to the work as required, and the lines 2 and 3 are controlled by instrumentalities common to derricks and well known to those skilled in the art, and which constitute no part of my invention.

The shovel is positioned for taking up and elevating and dumping said material by the line 2, the line 3 being utilized for holding the shovel in the dumping position desired. Assuming that the shovel is being loaded, its open-work construction will act particularly on the coarser and unworkable material, and if any of the finer and workable matter should be elevated, as the shovel is moved to its dumping location and position through the means provided by the derrick, the said matter will fall from the shovel when it may be subsequently acted upon by the monitor. When the shovel is thus moved to said location and position it may be maintained in place by the line 3, and then dumped by releasing the line 2.

As it may be noted, the scoop portion of the shovel is so connected with the yoke that it will swing to any practical dumping position, and the line 2, connected as it is with the bail disposed forwardly in said portion, carries the greater weight of the load, thereby taking strain from the pivotal connections of the scoop portion and permitting them to function freely. The dumping range of the shovel is increased by its capability for dumping at various angles, and said shovel presents a construction relatively light in weight but possessing adequate loading capacity for the purposes intended.

Changes in and modifications of the construction described may be made without departing from the spirit of my invention or sacrificing its advantages, hence I ask that I be not confined to the specific structure set forth, except as limited by the appended claims.

I claim:

1. A device of the class described, comprising a yoke, an arm secured to the body of the yoke and extending longitudinally of the shovel, a rod disposed between the ends of the yoke, a plurality of curved and spaced tines formed into a scoop portion and having their rear ends pivotally connected with the rod, a second rod extending through the forward ends of the tines for holding said tines in alignment, a pair of side members pivotally connected with the first rod and mounted on the second rod, and a bail swingingly secured to the side members.

2. A device of the class described, comprising a member for manipulating the shovel, a yoke carried by said member, a rod mounted between the ends of the yoke, a plurality of tines formed into a scoop portion and pivotally connected with the rod, an annular spacer mounted on said rod and disposed between each pair of said tines, a second rod extending through the tines adapted to reenforce and align said tines, and a pair of side members pivotally connected with the first rod and secured to the second rod.

3. In a device of the class described, a frame, a rod mounted in the frame, a plurality of spaced tines formed into a scoop portion and swingingly connected with the rod, a reenforcing and aligning rod extending through the tines, and a pair of side members swingingly connected with the first-named rod and secured to the second-named rod, the swinging connections for said tines being of such a character as to permit said scoop portion to assume any dumping angle.

CHARLES J. DUMBOLTON.